United States Patent [19]
Maile et al.

[11] Patent Number: 4,457,983
[45] Date of Patent: Jul. 3, 1984

[54] ROOFING SHEET WITH UPPER LAYER OF HIGHER MELTING POINT THAN ASPHALT

[75] Inventors: Walter E. Maile, Rochester; David Q. Boone, Holland, both of Mich.

[73] Assignee: Northern Fibre Products Co., Birmingham, Mich.

[21] Appl. No.: 381,333

[22] Filed: May 24, 1982

[51] Int. Cl.³ .............................................. B32B 7/00
[52] U.S. Cl. .................................... 428/213; 428/286; 428/291; 428/489; 428/522; 428/906
[58] Field of Search ............... 428/291, 489, 213, 286, 428/522, 906

[56] References Cited
U.S. PATENT DOCUMENTS 3,817,893  6/1974  Karcher ............................ 260/28.5
4,291,086  9/1981  Auten .................................. 428/242

FOREIGN PATENT DOCUMENTS 51-61132  5/1976  Japan.

Primary Examiner—Marion Mc Camish
Assistant Examiner—P. R. Schwartz
Attorney, Agent, or Firm—Cullen, Sloman, Cantor, Grauer, Scott and Rutherford

[57] ABSTRACT

A thin, relatively flexible sheet formed in strips for application upon a roof surface and the like, with successive strips in overlapping relationship, is formed of a lamination of a lower layer made of a low temperature heat softenable material such as asphalt, a thinner middle layer formed of a non-woven fabric of relatively stable fibers, and an upper layer formed of a high temperature melting point monolithic material such as an ethylene vinyl acetate copolymer. Heat is applied, as for example, by a hand operated flame torch, to the lower layer of a strip to soften it. Then the strip is laid upon the surface, with an edge portion overlapping the next adjacent strip previously laid upon the surface so that each strip adheres to the upper layer of the preceding strip upon cooling and solidification of the heat softened asphalt layer. The fabric layer and the upper layer together stabilize and reinforce the sheet lamination when the lower layer is heated for application and also whenever the lower layer develops cold weather cracks. The lower melting temperature of the lower layer protects the upper layer by becoming visually too soft or runny before the applied heat affects the upper layer.

1 Claim, 4 Drawing Figures

U.S. Patent  Jul. 3, 1984  4,457,983
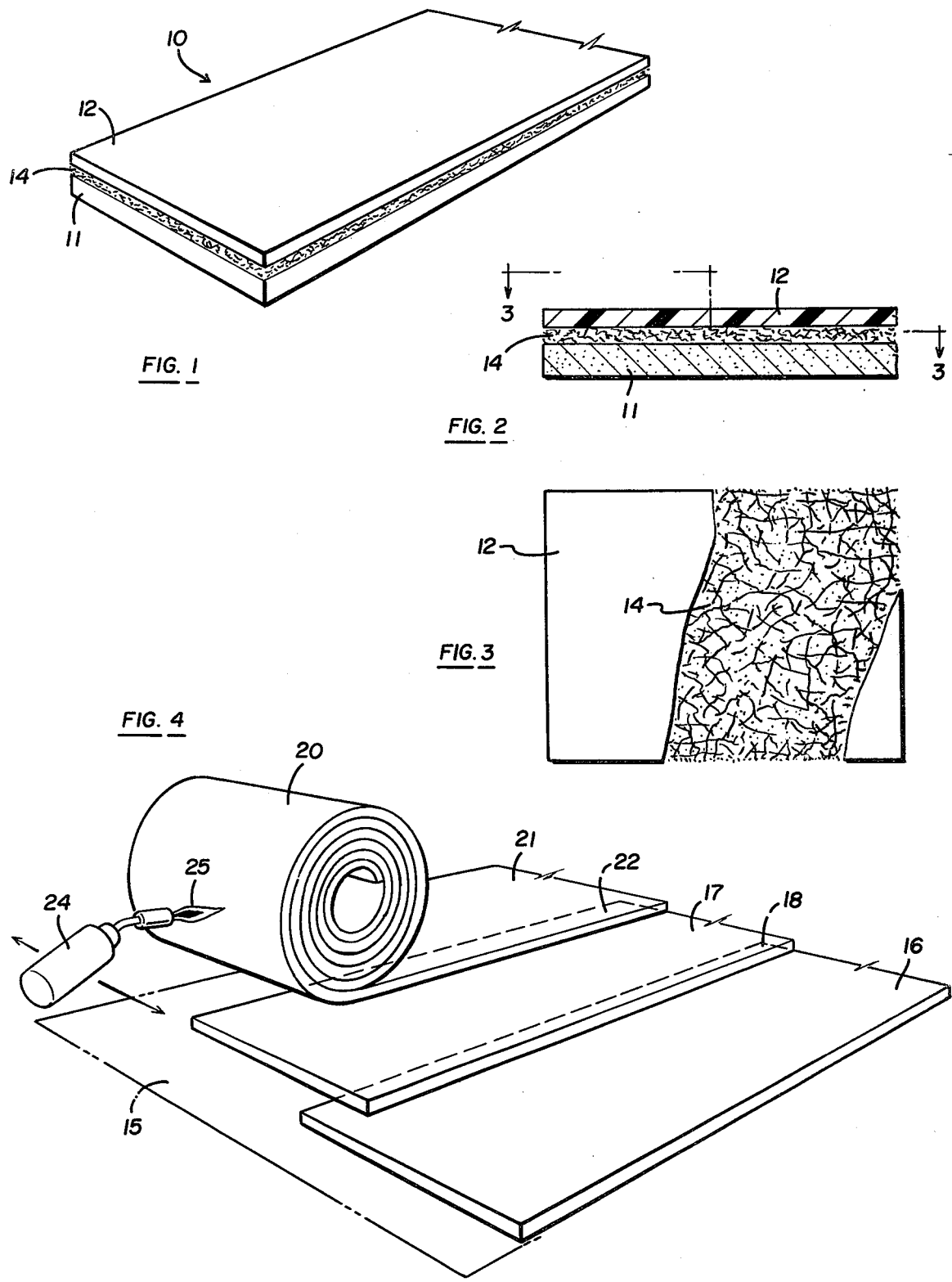

ROOFING SHEET WITH UPPER LAYER OF HIGHER MELTING POINT THAN ASPHALT

BACKGROUND OF INVENTION

Conventionally, roofs or roof decks of buildings and the like are commonly covered with so-called tar paper which, in turn, is covered with either shingles or is hot-mopped with tar. Since hot-mopping requires considerable labor, is relatively dangerous and difficult to perform and, cannot be done when the ambient temperature is too low, attempts have been made to find a substitute to eliminate or reduce such procedure.

Sheets of asphalt have been used by heating the sheets and laying them upon the roofing surface in overlapping relationship. This can eliminate the necessity of the step of applying a hot-mopping coating since the asphalt itself can form the roofing surface. However, the heating step used involves manually directing a torch against the lower surface of the asphalt sheet until it sufficiently melts or softens so that it can be applied against the roof surface and the overlapped portion of the adjacent sheet for adhering thereto. Since sheets of asphalt are relatively fragile to handle, such sheets have been made of upper and lower layers with a reinforcing fabric layer between them, thus forming a three layer lamination.

In using asphalt sheets, whether of single ply or of the laminated type, the application of heat to the surface of the lower layer must be performed very carefully. That is, insufficient heat will not uniformly soften the surface so as to obtain a uniform adherence to the overlapped surfaces. Areas where the sheet is not properly adhered can later blister or bubble. Conversely, the application of too much heat, particularly localized excessive heat where the torch is not moved carefully or swiftly enough so as to cause its flame to overheat a particular area, causes the asphalt to become runny and drip, thus ruining the lower layer and simultaneously heat softening and melting the upper layer. When this overheating occurs the integrity of the sheet is affected, i.e. the upper layer is thinned or holed or otherwise adversely affected. This adverse effect usually cannot be visually determined, particularly during the necessarily rapid movement of the workmen in heating and applying the sheets at awkward locations.

Because of the problems resulting from heat damage to the sheets, another form of sheet proposed for roofing is formed of a plastic material, such as synthetic rubber of suitable chemical composition. These sheets are applied by means of utilizing an adhesive so as to form an adhesively secured, continuous, water impervious sheet covering for the roof. However, there are disadvantages in utilizing adhesive securing means since the adhesive itself can be applied only where the temperature is in the relatively warm range and the uniformity of the adhesive coating upon the lower surface of the sheet is not easily obtained in the working conditions involved in applying the material upon a roof surface. In contrast, the heat softening technique used with the asphalt sheets can be utilized even during cold weather. That lengthens the season for roofing work and in addition, makes it possible to do repair work regardless of season.

Further, the rubber types of materials available are relatively expensive to purchase and use. Likewise, the adhesives required are also relatively expensive and as in the case of using any adhesive in an outdoor, variable weather environment, there are difficulties in obtaining a good, uniform application.

There is presently available commercially a type of synthetic plastic material known as ethylene vinyl acetate or "EVA" which is used as sound deadening sheet material in automotive applications and for backing material for automotive carpets. The material itself is formed in sheets by extruding it directly upon a substrate, such as a previously woven automotive carpet, or by extruding or calendering it as unsupported film or sheet which is then used in sheet form for lining areas to be sound deadened or protected. Examples of such use are within the side panels, door panels or interior roofing areas of the automobile metal body.

The specific compositions of such sheet material is varied considerably depending upon the quality, expense, available raw materials and the like. In addition, the basic ethylene vinyl acetate copolymer may be "filled" with substantial amounts of calcium carbonate, e.g. limestone, or clay or other inexpensive, readily available materials. The amounts of filler can be enhanced by adding oils to the blend which thus permit the formation of a usable mixture of plastic and filler which is relatively inexpensive and yet forms a monolithic, water impervious sheet.

The invention herein does not relate to the chemical composition or the technique for forming the sheet, all of which is known to those skilled in the art. A description of this type of material, which is commercially available from such suppliers as E. I. DuPont Denemours Company of Wilmington, Del., is found in DuPont's U.S. Pat. No. 4,191,791 issued Mar. 4, 1980 to Schumacher and entitled "Highly Filled Thermoplastic Compositions Based Upon Ethylene Interpolymers and Processing Oils". Such patent discloses various compositons and blends utilizing EVA with varying amounts of fillers such as clay, calcium carbonate and the like. The disclosure in such patent, which is relatively lengthy, is included herein by reference.

Other disclosures of the commercially available types of ethylene vinyl acetate copolymer sheets or materials which can be formed into sheets are found in the patent to Schwartz, U.S. Pat. No. 3,904,456 issued Sept. 9, 1975 which discloses a film or sheet having a sixty to ninety percent by weight inorganic filler material and useful for sound blocking purposes or as a sound blocking backing on carpets. Another disclosure is found in the patent to Gladding, U.S. Pat. No. 3,817,893 issued June 18, 1974. This patent describes an unfilled material having oil and wax additives and useful for sound attenuation.

Still another patent to Sands, U.S. Pat. No. 3,390,035 issued June 25, 1968, discloses the backing of tufted carpets with ethylene vinyl acetates applied as a hot melt. The composition includes an inert filler such as clay, calcium carbonate, silicon, etc. up to about fifty percent. An even earlier patent to Boier, U.S. Pat. No. 3,010,899 issued Nov. 28, 1961, discloses a ethylene vinyl acetate copolymer to which a clay filler is added, for use as an automobile undercoating.

The EVA materials, can be produced in sheet form to provide an inert sound attenuating, monolithic, water impervious surface. Thus, the invention herein relates to the utilization of such EVA material combined with asphalt, so as to obtain the advantages and economies of each and an overall improvement due to the coaction between them, for a roofing material or the like.

SUMMARY OF INVENTION

The invention herein contemplates forming a laminated sheet made of an inner or lower layer of asphalt, an upper or outer layer of EVA, and a central layer of a preferably non-woven, stable, fiberous fabric web material, with the three layers bonded together. The lamination provides a lower, heat softenable surface which can be applied against and adhered to a roofing surface or adjacent sheet layers upon which overlap seams are formed.

The invention comtemplates the use of conventional torching or flame heating of the asphalt surface to soften it sufficiently for application. However, the composite lamination maintains its dimensional and structural integrity due to the interlock between the three laminae or layers during the heating and application steps. Moreover, the application of heat to the asphalt layer does not effect the outer synthetic plastic layer. This comes about because the roofer who is applying heat to the asphalt layer will visually observe when the asphalt layer becomes runny, i.e. over softened. Up until that point, the amount of heat applied will not adversely affect the much higher melting plastic.

Of course, if the heat of the torch or flame is applied after the asphalt runs, that heat could adversely affect the intermediate fabric layer and the outer plastic layer. But, the runniness or melting of the asphalt instantly signals to the roofer that he has exceeded the maximum heat to be used at any particular location on the sheet.

Meanwhile, in the event of over softening or runniness caused by heat, the more stable plastic sheet, being unaffected, maintains the overall integrity of the sheet and prevents it from being ruined or having unseen small holes developed which ultimately will affect the integrity of the roof construction.

Once the sheet is laid, as for example, in overlapping seam types of strips upon a roof surface, the exposed plastic sheet protects the roof indefinitely and simultaneously, insulates and to some extent sound deadens the roof surface. Further, the bonded together plastic and fiber layers maintain the integrity and water tightness of the roof during times when environmental cold causes the asphalt to shrink and crack, as normally occurs. At that point, the sheet is maintained dimensionally stable and still protects the roof surface until such time as the environmental temperatures are sufficiently warm to permit the vinyl to soften and self-heals the cracks.

Thus, a significant advantage of the invention herein is that the roofing sheet can be applied with ease in any weather conditions, even very cold weather, within the range of worker ability to perform the function. The worker cannot accidentally or unknowingly ruin the sheet or the seal by over heating at any point because of the visual signal given by the asphalt starting to run when too much heat is applied at any one point.

The sheet of this invention is normally applied without the hot tar mopped step commonly used in many roofing applications. Thus, the expense of application and the amount of skilled labor required is significantly reduced. Moreover, costs are further reduced because of the commercial availability of suitable EVA materials and the ability of utilizing such materials containing fillers blended by the supplier to provide the particular specified flexibility or stiffness of the sheets, thicknesses, weather resistance and the like.

These and other objects and advantages of this invention will become apparent upon reading the following disclosure of which the attached drawings form a part.

DESCRIPTION OF DRAWINGS

FIG. 1 is a perspective view of a laminated sheet.

FIG. 2 is an enlarged cross-sectional, fragmentary view of the sheet.

FIG. 3 is a plan view, partially fragmented, of the sheet, taken in the direction of arrows 3—3 of FIG. 2.

FIG. 4 is a perspective, fragmentary view of a series of strips showing the application of a strip upon a roof surface.

DETAILED DESCRIPTION

Referring to FIGS. 1–3 of the drawings, the sheet 10 comprises a lamination of a lower or inner layer 11, an upper or outer layer 12 and an intermediate or middle layer 14. The lower layer melts or softens at a temperature considerably lower than that of the upper or outer layer. Thus, preferrably the lower layer is formed of conventional asphalt type sheet material. The upper layer is formed of conventional commercially available ethylene vinyl acetate or EVA compounded to be water impervious and weather resistant.

Preferably the asphalt layer is considerably thicker than the EVA layer, such as roughly twice as thick. By way of example, the asphalt layer may be approximately 0.06 inches thick while the EVA layer may be about 0.030 inches thick.

The middle fabric layer 14 is preferably formed of a web of non-woven fibers which are stable and capable of lasting in the environment of the sheet. Rayon fibers, or other commercially available similar fibers, formed into a non-woven web is suitable for this purpose. The web or middle layer is much thinner than either the asphalt or EVA layers, such as for example, in the range of about 0.005 inches long.

In forming the sheet material, the EVA layer can be extruded or otherwise applied as a film upon the non-woven fiber layer. Then the sheet may be turned over and the asphalt layer may be applied hot upon the exposed fiber layer. The lamination can be made using conventional, available sheet forming equipment.

The asphalt mechanically interlocks with or is embedded in the fibers, as does the EVA, so that there is a mechanical bond which stabilizes the laminae both dimensionally and against separation of the layers.

The laminated sheet may be formed into elongated strips which may be handled as flat strips or may be coiled into rolls. Alternatively, the strips can be in short lengths, in shingle-like form.

FIG. 4 illustrates the application of the sheets upon a roof type surface 15 which is schematically shown. A strip 16 is first applied to the surface 15. Thereafter, the next strip 17 is applied with an overlapped seam 18 formed. Next, as illustrated in the drawing, a roll 20 is positioned so that it forms a strip 21, as it is unwound, upon the roof surface with an overlapped seam 22 formed with the adjacent strip 17.

As the roll 20 is unwound, a conventional torch 24 is manually manipulated so that its flame 25 heats the exposed surface of the asphalt lower layer to soften it. The roll is unwound sufficiently to cause the softened surface to apply and to adhere to the roof surface 15 as well as the upper surface of the adjacent strip 17.

By observing the state of the asphalt surface, particularly by being alert to the beginning of drops or runny conditions, the worker is immediately signaled to discontinue heating an area which is becoming over heated. This protects the strip against damage due to heat. Meanwhile, although the asphalt is softened and might even become runny, the integrity of the sheet and its dimensional stability is preserved due to the upper EVA sheet and the interlocking fiber layer.

The strips are laid upon the roof surface and form the overlapping seams, successively, until the complete roof surface is formed. At this point, no further treatment of the roof surface is required. Particularly, the need for hot mopping with molten tar is completely eliminated.

Because the sheets comprise a softenable surface and an opposite relatively nonsoftenable surface, they may be utilized for other purposes. For example, it would be relatively easy to form such sheets, in large molds, into lining parts for the interiors of automobile bodies to form sound absorbing panels. The practicality of such uses, where commercially feasible, stem from the unique ability of the sheet to be softened for adhesion purposes while preserving its dimensional stability.

The preferred materials for the sheet are commercially available EVA compositions, particularly filled EVA, so as to take maximum cost advantage of available commercial materials, and also commercially available asphalt. However, alternative materials may become commercially available and thus, the reference to the materials by their specific names is contemplated as referring to those materials and the like materials having the same characteristics for this intended purpose.

Having fully described an operative embodiment of this invention, I now claim:

1. A roofing sheet for application by use of heat upon a roof surface and the like, consisting of:

a unitary relatively thin, flexible sheet suitable for being coiled into a roll and formed of a lamination of a lower layer of asphalt, an upper layer of a synthetic plastic material, and a middle layer of fabric material wherein said synthetic plastic material consisting of an ethylene vinyl acetate and said fabric layer being formed of a non-woven, synthetic fiber material which is mechanically bonded into the adjacent surfaces of the two layers and said asphalt layer being roughly twice as thick as the ethylene vinyl acetate layer and with the middle non-woven synthetic fiber layer being considerably thinner than the ethylene vinyl acetate layer;

said plastic material having a melting point which is considerably higher than the melting point of asphalt so that the application of heat to the asphalt for softening it will not affect the layer of ethylene vinyl acetate, said plastic material being monolithic and water impervious, and said asphalt layer forming a heat softenable indicator surface while said opposing plastic layer forming a heat resistant, water impervious surface;

said middle fabric layer being formed of fibers having a melting point which is considerably higher than asphalt and being locked to the asphalt layer and serving as a reinforcement for stabilizing the sheet dimensionally, and holding the upper and lower layers together, and also holding the asphalt layer intact during the times of any shrinkage and cracking thereof, due to the sheet being exposed to relatively cold temperatures, until the asphalt layer self-heals any such cracks when subjected to natural warmth; and said asphalt indicator layer softening and then melting in response to flame heating of said asphalt layer thereby providing a signal to a roofer that he has exceeded the maximum heat to be used at any particular location on said sheet.

* * * * *